US008710794B2

(12) United States Patent
Rapoport et al.

(10) Patent No.: US 8,710,794 B2
(45) Date of Patent: Apr. 29, 2014

(54) METHOD AND APPARATUS FOR A BATTERY DOCKING CONNECTOR HAVING RESERVE POWER FOR HOT BATTERY SWAP

(75) Inventors: Loren W. Rapoport, Richardson, TX (US); Zachary M. Gaubert, Dallas, TX (US)

(73) Assignee: Raytheon Company, Waltham, MA (US)

( * ) Notice: Subject to any disclaimer, the term of this patent is extended or adjusted under 35 U.S.C. 154(b) by 402 days.

(21) Appl. No.: 13/268,210

(22) Filed: Oct. 7, 2011

(65) Prior Publication Data

US 2013/0088185 A1    Apr. 11, 2013

(51) Int. Cl.
*H02J 7/00* (2006.01)
*H02J 1/10* (2006.01)
*G06F 1/16* (2006.01)
*H01R 31/02* (2006.01)
*H01R 27/00* (2006.01)

(52) U.S. Cl.
CPC ............... *H02J 7/0054* (2013.01); *H02J 1/10* (2013.01); *G06F 1/1632* (2013.01); *H01R 31/02* (2013.01); *H01R 27/00* (2013.01)
USPC .................. 320/103; 307/80; 361/679.41

(58) Field of Classification Search
CPC ......... H02J 7/0054; H02J 1/10; G06F 1/1632; H01R 31/02; H01R 27/00
USPC ............................................. 320/103; 307/80
See application file for complete search history.

(56) References Cited

U.S. PATENT DOCUMENTS

| | | | |
|---|---|---|---|
| 7,380,143 B2 | 5/2008 | Gold et al. | |
| 7,397,671 B2 * | 7/2008 | Cleveland et al. | 361/756 |
| 7,480,139 B2 | 1/2009 | Ryder et al. | |
| 7,555,363 B2 | 6/2009 | Augenbraun et al. | |
| 7,741,808 B2 | 6/2010 | Fowler et al. | |
| 8,013,572 B2 * | 9/2011 | Rodgers | 320/114 |
| 2008/0157712 A1 * | 7/2008 | Garcia | 320/101 |
| 2009/0115367 A1 * | 5/2009 | Kidakam | 320/101 |
| 2009/0251007 A1 * | 10/2009 | Adams et al. | 307/70 |
| 2011/0037426 A1 * | 2/2011 | Idzik et al. | 320/103 |
| 2011/0101908 A1 * | 5/2011 | Liao | 320/103 |
| 2011/0148344 A1 * | 6/2011 | Manor et al. | 320/103 |
| 2011/0181235 A1 * | 7/2011 | Walley et al. | 320/103 |
| 2011/0298414 A1 * | 12/2011 | Manor et al. | 320/103 |
| 2011/0316472 A1 * | 12/2011 | Han et al. | 320/103 |
| 2013/0082638 A1 * | 4/2013 | Liang | 320/103 |

* cited by examiner

*Primary Examiner* — M'Baye Diao
(74) *Attorney, Agent, or Firm* — Daly, Crowley, Mofford & Durkee, LLP

(57) ABSTRACT

Methods and apparatus for a battery backup system having a docking connector with reserve battery cells to power a device when a main battery is not present during battery swap out or depletion. In one embodiment, the reserve batteries are high discharge rate batteries to provide power to the device.

16 Claims, 5 Drawing Sheets

METHOD AND APPARATUS FOR A BATTERY DOCKING CONNECTOR HAVING RESERVE POWER FOR HOT BATTERY SWAP

BACKGROUND

As is known in the art, many types of equipment require batteries that must be changed after a period of time. In some circumstances, it is critical to swap out batteries as quickly as possible. For example, for first responders and soldiers, the amount of time required to change batteries can be extremely important. Further, main battery swap out may require a shutdown of the powered system, which also requires a potential time-consuming restart.

SUMMARY

The present invention provides methods and apparatus for a battery swap system including a battery docking connector having at least one reserve cell to enable main battery swap out. With this arrangement, a user can easily and rapidly swap out a depleted main battery with a replacement main battery without device power down and power up. While exemplary embodiments of the invention are shown and described in conjunction with powering first responder and military equipment, it is understood that embodiments of the invention are applicable to battery powered systems in general in which it is desirable to replace a main battery without interruption to operation of a device powered by a battery. For example, laptop computers, GPS devices, cell phones, portable reading devices, portable medical devices and the like may benefit from the ability to swap out batteries without powering down.

In one aspect of the invention, a battery swap system comprises a battery docking connector including: a first connector to connect with a main battery, a second connector to provide power to a device, reserve power cell terminals for a reserve power cell to provide power to the device when the main battery is not connected to the battery docking connector, a battery protection module coupled to the reserve power cell for controlling charge and discharge of the reserve power cell, a battery recharge module coupled to the battery protection module to enable charging of the reserve power cell from the main battery at a limited rate to protect the main battery, and a battery backup switch module coupled to the battery recharge module and to the battery protection module, the backup switch module to switch connections between the main battery and the reserve battery depending upon whether the main battery is connected for enabling hot swap of the main battery.

The system can further include one or more of the following features: the reserve power cell comprises at least one high discharge rate battery, the reserve power cell comprises at least one high discharge rate battery that discharges at a rate at least four times higher than a capacity of the high discharge rate battery, the reserve power cell comprises at least three batteries, the reserve power cell comprises multiple batteries coupled in series and/or parallel, a housing to capture the main battery and a base attachable to the housing, wherein base is configured for attachment to clothing, the battery docking connector includes a first side that is shaped to conform to an end of the main battery, the reserve power cell is replenished by power from the main battery, and/or the battery docking connector includes contacts for forming an electrical connection to charging ports on the main battery.

In another aspect of the invention, a system comprises a battery-powered device, a main battery to power the device, and a battery docking connector including: a first connector to connect with the main battery, a second connector to provide power to the device, reserve power cell terminals for a reserve power cell to provide power to the device when the main battery is not connected to the battery docking connector, a battery protection module coupled to the reserve power cell for controlling charge and discharge of the reserve power cell, a battery recharge module coupled to the battery protection module to enable charging of the reserve power cell from the main battery at a limited rate to protect the main battery, and a battery backup switch module coupled to the battery recharge module and to the battery protection module, the backup switch module to switch connections between the main battery and the reserve battery depending upon whether the main battery is connected for enabling hot swap of the main battery.

The system can further include the reserve power cell comprising at least one high discharge rate battery and/or the reserve power cell being replenished by power from the main battery.

In a further aspect of the invention, a method comprises employing a battery docking connector including: a first connector to connect with a main battery, a second connector to provide power to a device, reserve power cell terminals for a reserve power cell to provide power to the device when the main battery is not connected to the battery docking connector, a battery protection module coupled to the reserve power cell for controlling charge and discharge of the reserve power cell, a battery recharge module coupled to the battery protection module to enable charging of the reserve power cell from the main battery at a limited rate to protect the main battery, and a battery backup switch module coupled to the battery recharge module and to the battery protection module, the backup switch module to switch connections between the main battery and the reserve battery depending upon whether the main battery is connected for enabling hot swap of the main battery.

The method can further include the reserve power cell comprising at least one high discharge rate battery, the reserve power cell being replenished by power from the main battery, and/or the battery docking connector including contacts for forming an electrical connection to charging ports on the main battery.

BRIEF DESCRIPTION OF THE DRAWINGS

The foregoing features of this invention, as well as the invention itself, may be more fully understood from the following description of the drawings in which.

DETAILED DESCRIPTION

Figure 1:
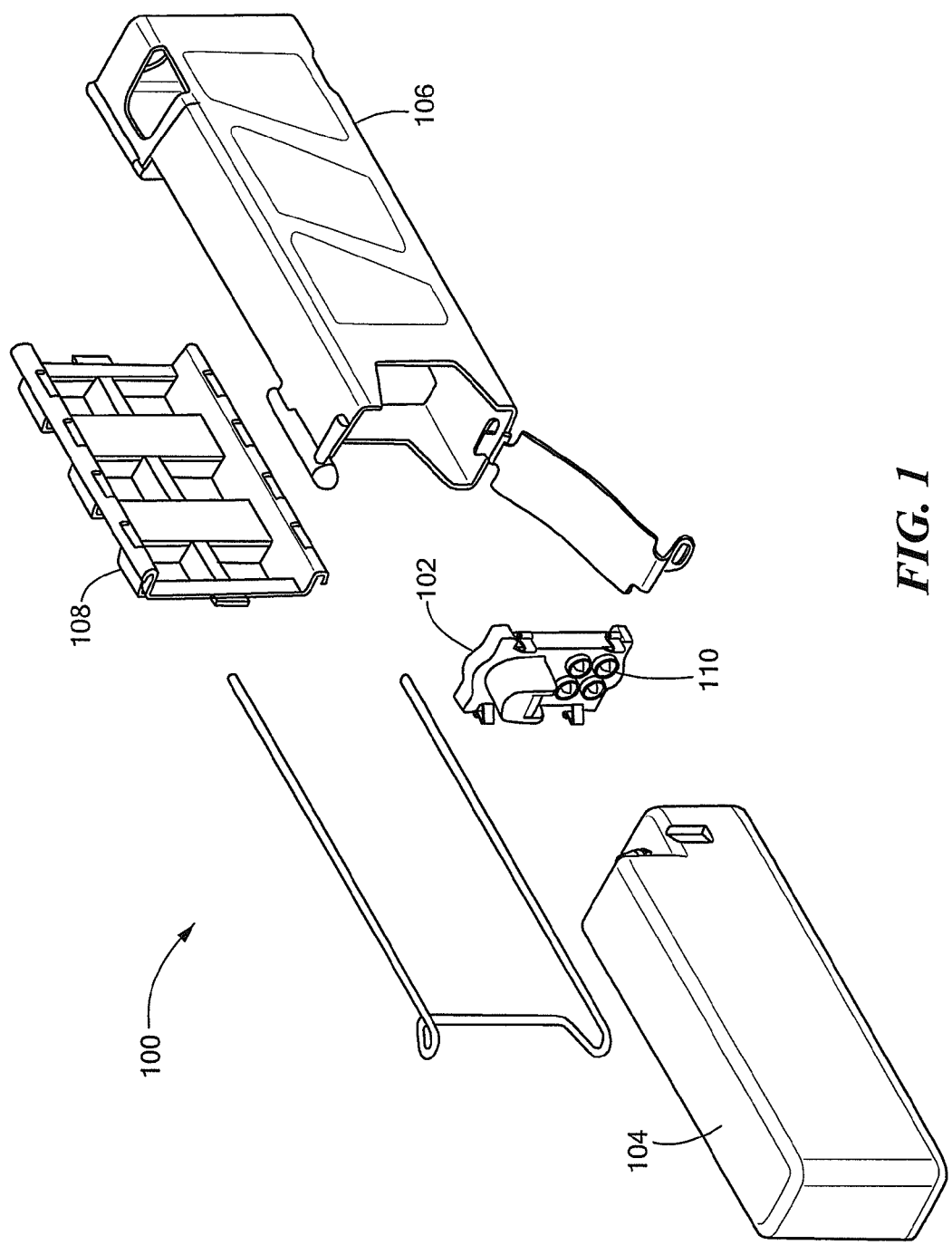
FIG. 1 is an exploded schematic representation of an exemplary battery swap system in accordance with exemplary embodiments of the invention.
Figure 1A:
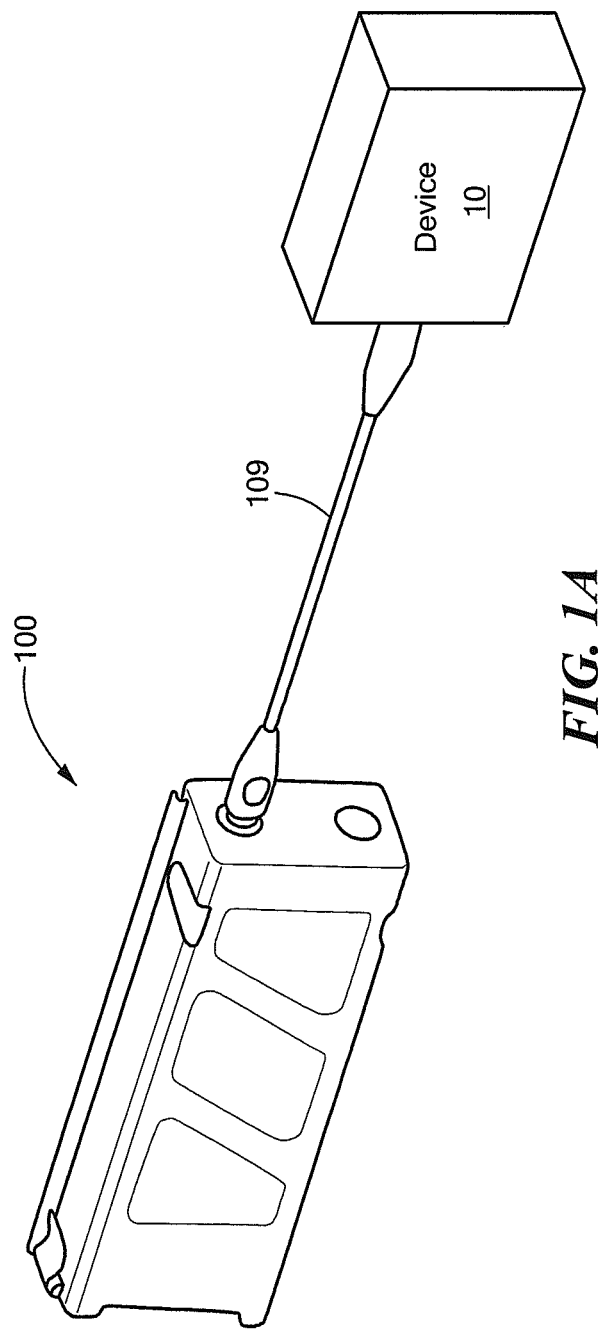
FIG. 1A is a pictorial representation of the battery swap system of FIG. 1.

FIG. 1 shows an exemplary battery swap system 100 in accordance with exemplary embodiments of the invention. The battery swap system 100 includes a battery docking connector 102 that is engageable with a main battery 104 for powering a device 10. The docking connector 102 is removable from a housing 106 that can be secured to a user. In one embodiment, the housing is removably secured to a base 108, which can be affixed to the user's clothing for example. As shown in FIG. 1A, the system 100 can include a cable 109 that can be coupled to the device 10. It is understood that device 10 can comprise any battery powered device including communication systems, sensor systems, weapon systems, etc.

Figure 2A:
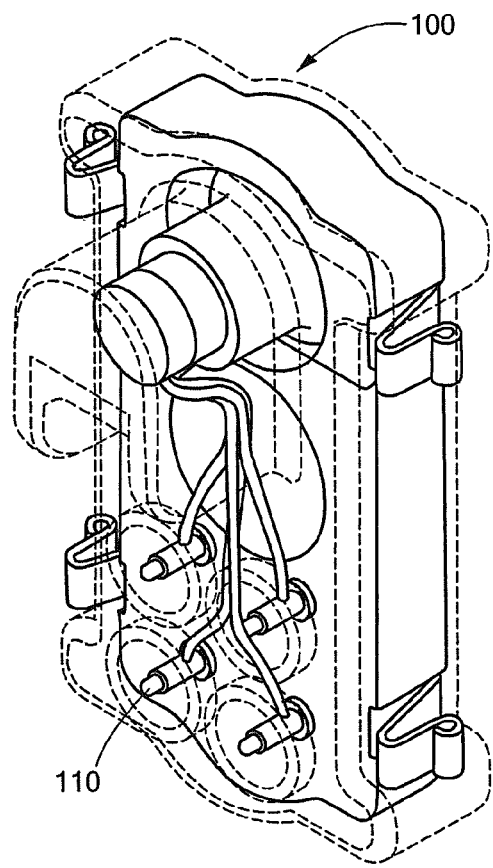
FIG. 2A is a schematic representation of a battery docking connector that can form a part of the battery swap system of FIG. 1.
Figure 2B:
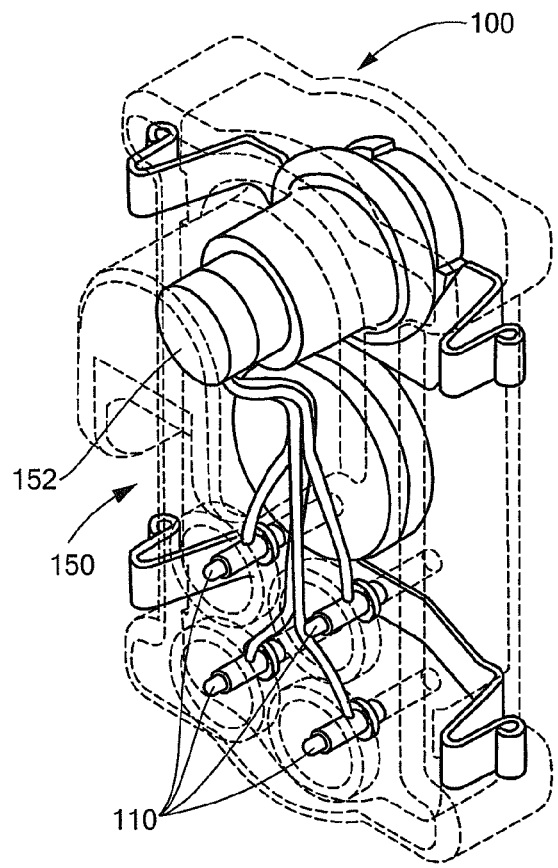
FIG. 2B is a representation of the battery docking connector of FIG. 2A with certain portions made transparent.
Figure 3:
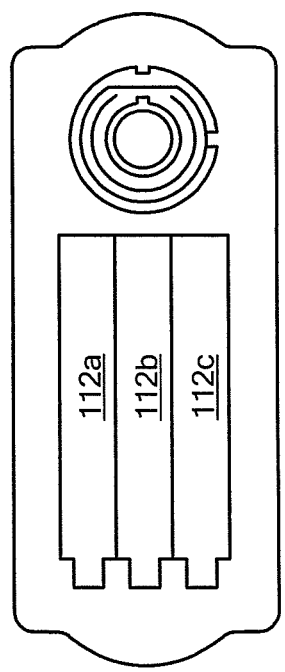
FIG. 3 is a side view of an exemplary battery docking connector having three reserve battery cells in accordance with exemplary embodiments of the invention.

Referring to FIG. 1 in conjunction with FIGS. 2A and 2B, the battery docking connector 102 includes docking clip contacts 110 to establish electrical connection to the battery 104. The battery docking connector 102 includes at least one reserve battery cell 112 (see FIG. 3) to supply power to the device 10 during the battery swap process. That is, when the main battery 104 is removed from the housing 106 for replacement by a fully charged main battery, the reserve battery cells 112a, b, c, provide power to the device until the new battery is in place.

With this arrangement, when the user removes the main battery 104 from the housing 106, the device 10 remains up and running until the new main battery is inserted into the housing. This avoids the need to power up and power down a device to swap the battery 104. One of ordinary skill in the art will readily appreciate the advantages of avoiding system down time for battery swap, and in particular, for first responders and soldiers.

It is understood that any practical number of reserve cells 112 can be used, in series and/or parallel configurations, to meet the needs of a particular application. The number of cells can be determined by the required voltage and current, size, weight, battery characteristics, and the like.

In one embodiment, in the event that the docking connector 102 fails or is lost, it can be removed so that the main battery 104 can directly power equipment. For example, a conventional battery cable can be coupled to the main battery and extend from an aperture in the housing for connection to a device.

In one embodiment shown in FIG. 2B, the docking connector 102 has a first side 150 that is shaped to complement an end of the main battery 104 (FIG. 1). In the illustrated embodiment, the first side 150 of the docking connector has a protrusion 152 to meet the stepped shape of the battery end.

In an exemplary embodiment, the housing 106 provides an environmental seal for the battery 104 and docking connector 102. The sealed housing 106 is molded around sealed contacts and is configured to provide a molded surface seal to press against the main battery.

In one embodiment, the reserve battery cells 112 are high discharge rate batteries that provide limited reserve power to the device with little impact to the size or weight of the device. The high discharge rate batteries enable the limited amount of stored capacity in the reserve cells to maintain a required level of power to the device for a relatively short amount of time, as compared to the main battery. As used herein, high discharge rate batteries refer to batteries that can discharge power at a rate that is at least four times higher than the rated battery capacity. For example, a high discharge battery rated at 1 A/h battery can discharge in fifteen minutes. It is understood that high discharge batteries can have significantly higher discharge rates than four times the capacity. While high discharge batteries can range in voltage, typical voltages are in the order of 3 to 4 volts.

It is understood that the battery size, voltage, number, and discharge rate are selected to meet the needs of a particular application. For example, a piece of equipment powered by the main battery will require a particular voltage at a given current level that is supplied by the reserve cell(s) 112 when a depleted main battery 104 is swapped for a charged main battery. While the reserve cell provides battery power to the device that is comparable to the main battery, the discharge rate for the reserve cell is considered high in view of the small capacity of the reserve cell as compared to the main battery. For example, for ten minutes of operation time for a system may comprise three 200 mah 3.7 V cells to provide limited power at 11.1 V. To reduce weight further for only five minutes of operational time, a reserve cell can include three 100 mah 3.7 V cells, or to extend reserve power time for fifteen minutes, a reserve could comprise three 300 mah 3.7V cells. While 9V is typically the maximum voltage for portable devices, exemplary embodiments of the invention can provide hot swap of batteries for high voltage devices, such as over 10V, and high current devices, such as over 1 A.

It is understood that any suitable battery technology can be used for the reserve cells. Exemplary battery materials include Lithium ION, Lithiuim Polymer, Lithium Iron Phosphate. In general, high density battery materials are preferred where there are space and/or weight considerations for a particular application.

Figure 4:
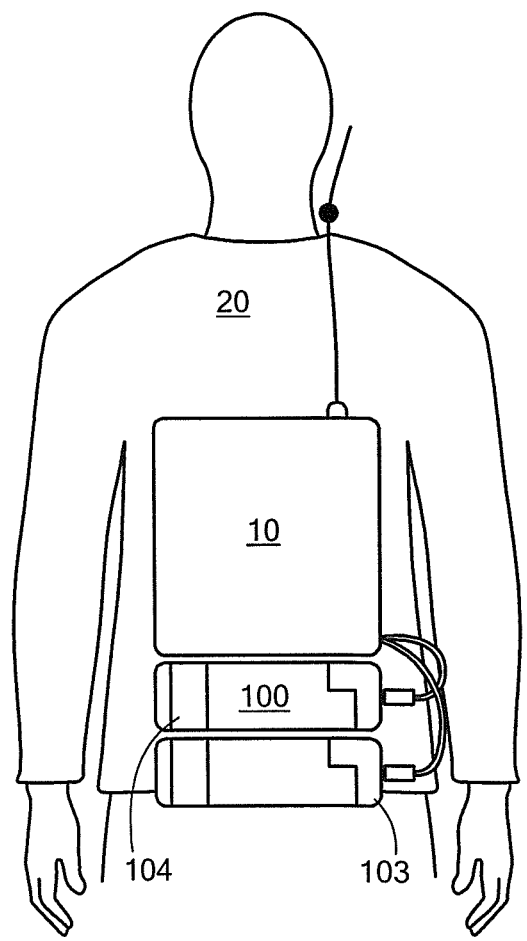
FIG. 4 is a schematic representation of a battery swap system worn by a user.
Figure 5:
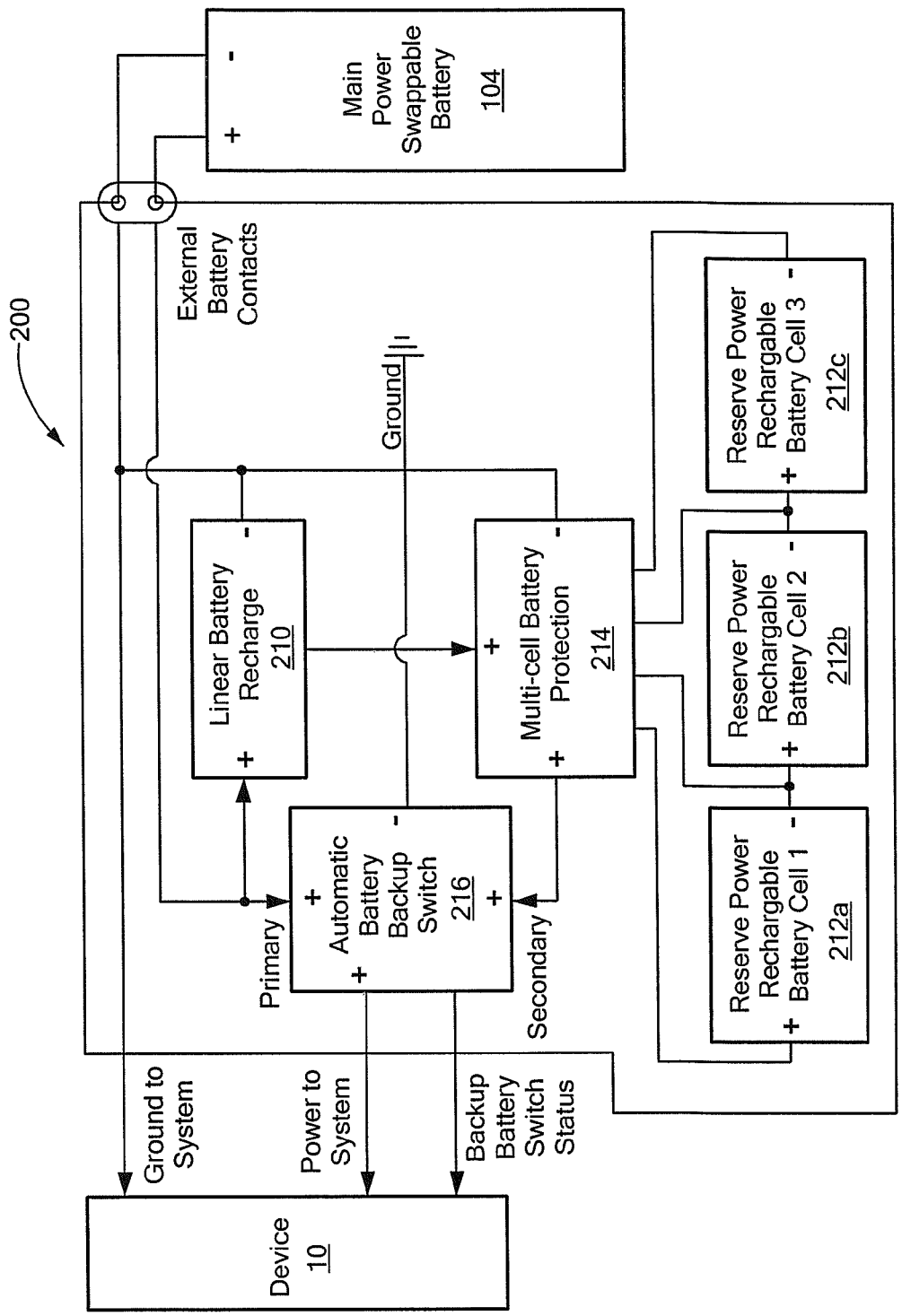
FIG. 5 is an exemplary implementation of a circuit for a battery swap system in accordance with exemplary embodiments of the invention.

FIG. 4 is a pictorial representation of a user 20 carrying a battery swap system, such as the battery swap system 100 of FIG. 1. The user 20 carries a device 10, such as a communication system, that is powered by the battery swap system 100. The user 20 carries a fully charged replacement battery 103. When the first battery 104 becomes depleted, the user removes the first battery from the battery swamp system 100 and inserts the replacement battery 103. Operation of the device 10 is not interrupted by the battery swap. During the time that the battery swap system 100 does not contain a battery, the reserve battery cells power the device. FIG. 5 shows a functional block diagram of an exemplary battery swap circuit 200 forming a part of a battery docking connector, such as battery docking connector 102 of FIG. 1, in accordance with exemplary embodiments of the invention. The circuit 200 is configured for connection to main power swappable battery 104 and a device 10 powered by the battery 104.

The circuit 200 includes a linear battery recharge module 210 to enable replenishment of reserve battery cells 212 when a sufficiently charged main power battery 104 is connected. A battery protection module 214 provides voltage and current protection during charging and discharging the reserve power battery cells 212. By controlling the charge and discharge operation to remain with specified voltage and current parameters for the battery cells, damage is prevented that could impact performance. An automatic battery switching module 216 switches power between the main power battery 104 and the reserve battery cells 212.

The battery protection module 214 protects the reserve cells 212 by preventing overcharging and overdischarging. If one or more of the reserve battery cell voltages becomes greater than a predetermined threshold, charging is terminated. Charging can continue if the voltage of the reserve battery cell drops below the threshold or if the battery is discharging and the voltage is less than a second threshold. The battery protection module stops discharging of the reserve cell if the voltage level drops below a discharge voltage threshold. If the discharge current from a reserve battery cell is greater than a discharge current threshold, discharging is terminated.

The battery recharge module 210 limits the amount of power from a charged main battery 104 to the reserve cells 212. By limiting the current to the reserve cells, operation of the main battery in providing power to a connected device is not impacted to ensure that the device is properly powered. In addition, by limiting current to the reserve cells, the main battery 104 is protected from overdischarge.

The automatic battery backup module 216 has a primary connection to the main battery 104 and a secondary connection to the reserve power cells 212 via the battery protection module 214. When the (primary) main battery 104 is not present (or is depleted to less than a threshold voltage), the automatic battery backup module 216 automatically switches to the (secondary) reserve power cells 212 to power the device. When the main battery becomes present (or is charged above a threshold voltage), the automatic battery backup module 216 switches to the main battery 104 from the reserve cells 212. In one embodiment, battery status is monitored in the host systems. For example, a laptop device can include a monitor for the main battery power. Once power drops below a set threshold, power supply switches over from main to reserve power.

In one embodiment, the battery protection module 214 includes part no. S-8254 by Seiko Instruments of Torrance, Calif., the battery recharge module 210 includes part no. MAX17435 by Maxim Integrated Products of Sunnyvale, Calif., the battery backup switch module 216 includes part no. C-8426A by Seiko Instruments, and/or part no. ICL7673 by Intersil Incorporation of Milpitas, Calif.

It is understood that a wide variety of main battery types can be used to meet the needs of a particular application. In one embodiment, the docking connector is configured for connection to a Mil-Spec LI-145/LI-80 type battery. Any practical type of battery can be used for the main battery.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A battery swap system, comprising:
a battery docking connector including:
a first connector to connect with a main battery; a second connector to provide power to a device;
reserve power cell terminals for a reserve power cell to provide power to the device when the main battery is not connected to the battery docking connector;
a battery protection module coupled to the reserve power cell for controlling charge and discharge of the reserve power cell;
a battery recharge module coupled to the battery protection module to enable charging of the reserve power cell from the main battery at a limited rate to protect the main battery; and
a battery backup switch module coupled to the battery recharge module and to the battery protection module, the backup switch module to switch connections between the main battery and the reserve power cell depending upon whether the main battery is connected for enabling hot swap of the main battery.

2. The system according to claim 1, wherein the reserve power cell comprises at least one high discharge rate battery.

3. The system according to claim 1, wherein the reserve power cell comprises at least one high discharge rate battery that discharges at a rate at least four times higher than a capacity of the high discharge rate battery.

4. The system according to claim 1, wherein the reserve power cell comprises at least three batteries.

5. The system according to claim 1, wherein the reserve power cell comprises multiple batteries coupled in series and/or parallel.

6. The system according to claim 1, further including a housing to capture the main battery and a base attachable to the housing, wherein the base is configured for attachment to clothing.

7. The system according to claim 1, wherein the battery docking connector includes a first side that is shaped to conform to an end of the main battery.

8. The system according to claim 1, wherein the reserve power cell is replenished by power from the main battery.

9. The system according to claim 1, wherein the battery docking connector includes contacts for forming an electrical connection to charging ports on the main battery.

10. A system, comprising:
a battery-powered device; a main battery to power the device; and a battery docking connector including:
a first connector to connect with the main battery; a second connector to provide power to the device;
reserve power cell terminals for a reserve power cell to provide power to the device when the main battery is not connected to the battery docking connector;
a battery protection module coupled to the reserve power cell for controlling charge and discharge of the reserve power cell;
a battery recharge module coupled to the battery protection module to enable charging of the reserve power cell from the main battery at a limited rate to protect the main battery; and
a battery backup switch module coupled to the battery recharge module and to the battery protection module, the backup switch module to switch connections between the main battery and the reserve power cell depending upon whether the main battery is connected for enabling hot swap of the main battery.

11. The system according to claim 10, wherein the reserve power cell comprises at least one high discharge rate battery.

12. The system according to claim 10, wherein the reserve power cell is replenished by power from the main battery.

13. A method, comprising:
employing a battery docking connector including:
a first connector to connect with a main battery; a second connector to provide power to a device;
reserve power cell terminals for a reserve power cell to provide power to the device when the main battery is not connected to the battery docking connector;
a battery protection module coupled to the reserve power cell for controlling charge and discharge of the reserve power cell;
a battery recharge module coupled to the battery protection module to enable charging of the reserve power cell from the main battery at a limited rate to protect the main battery; and
a battery backup switch module coupled to the battery recharge module and to the battery protection module, the backup switch module to switch connections between the main battery and the reserve power cell depending upon whether the main battery is connected for enabling hot swap of the main battery.

14. The method according to claim 13, wherein the reserve power cell comprises at least one high discharge rate battery.

15. The method according to claim 13, wherein the reserve power cell is replenished by power from the main battery.

16. The method according to claim 13, wherein the battery docking connector includes contacts for forming an electrical connection to charging ports on the main battery.

\* \* \* \* \*